May 24, 1927.
R. STRESAU
1,630,037
ELECTRICALLY WELDED BUBBLE TOWER
Filed Aug. 12, 1925
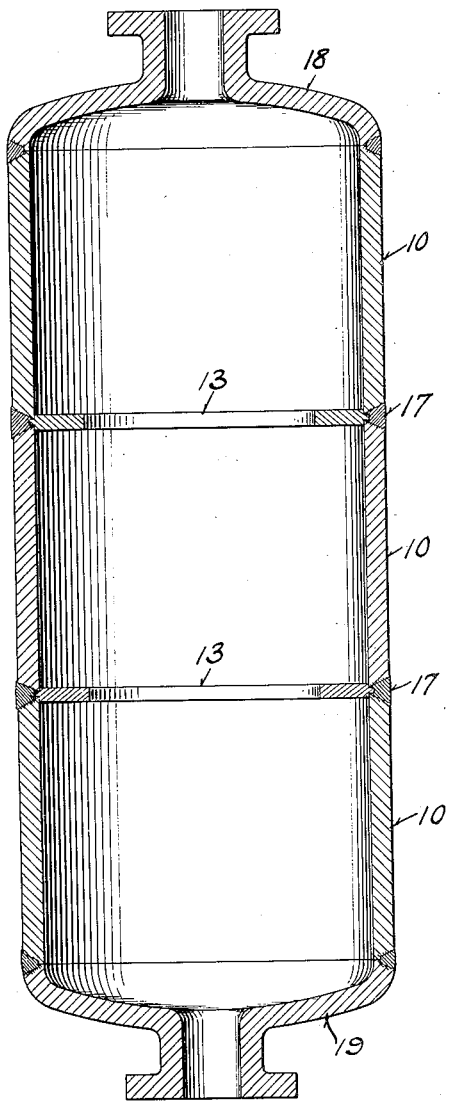
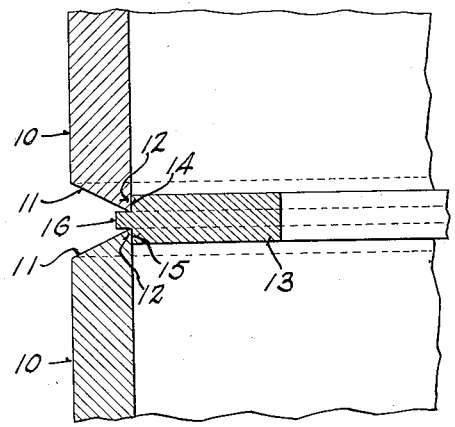
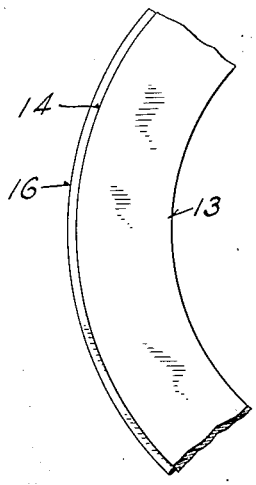
INVENTOR.
RICHARD STRESAU
BY
Erwin, Wheeler & Woolard.
ATTORNEYS.
WITNESS:
Fred Palm
DEL.

Patented May 24, 1927.

1,630,037

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

ELECTRICALLY-WELDED BUBBLE TOWER.

Application filed August 12, 1925. Serial No. 49,719.

The invention relates to an improved construction of bubble towers for use in crude oil distillation, and to a method of making the same by arc welding. The bubble tower is comprised of a succession of annular sections of thick metal and large diameter welded in the circular line of their meeting ends to produce a structure of the desired length. The method of welding enables me to utilize heavy plates, and so construct bubble towers of greater strength and durability than heretofore has been possible.

Specially prepared dividing plates or shelves are incorporated in the structure by welding peripherally of the plates or shelves in the meeting line of the successive tubular sections, forming the bubble tower. Such plates or shelves are in the form of flat rings, and are machined so as to form upon the peripheral edge of each of them a projecting circumferential rib or tongue, which is adapted to be disposed between and engaged by the inner edges of adjoining tubular sections of the tower, and slightly space the same apart so as to aid in the formation of the welding groove which extends circumferentially of the assembled sections. The formation and arrangement of the ring plates in the manner described, enables the shelves to be positioned automatically at proper points in the length of the bubble tower. The welding groove created by separating the meeting edges of the tubular sections by the insertion of the shelves, may be further widened in any necessary degree by machining the ends of such sections.

After the parts of the structure prepared in the manner described have been assembled with the adjacent ends of two tubular sections engaging the ring, the metal of the parts in the region of the circumferential meeting line is fused by an electric arc, so as to weld the parts into an integral structure. Other tubular sections are welded to the fused unit in the same manner until a tube of the desired length is produced. The tower is completed by welding thereto on circumferential lines the necessary heads or ends, in the meeting lines of which welding grooves are formed by machining, as before.

The method of welding I preferably employ in connecting the parts, is the metallic arc method, in which the arc is conducted to the work by a fusible weldrod, the molten metal flowing from which is deposited in the welding groove and incorporated with the fused portions of the adjacent structural parts. The welding metal thus supplied may be supplemented by placing strips of suitable material in the grooves to contribute additional welding material, and thus lessen the consumption of weldrods.

The novel features residing in my invention will be pointed out in the appending claims.

In the accompanying drawing:

Figure 1 is a vertical, central, sectional view through a bubble tower constructed in accordance with my invention.

Fig. 2 is a like view in the same plane, enlarged, of a portion of the bubble tower, and showing in detail certain structural features.

Fig. 3 is a plan view of the sections of one of the dividing plates or shelves.

Referring to the drawing, the numeral 10 indicates a plurality of annular sections which I produce by rolling metal plates of excessive thickness into tubes having a diameter of about six feet, each of which is welded on the longitudinal meeting line of its abutting edges. Preferably such edges are machined so as to produce a suitable welding groove, which is filled with welding material deposited by a fusible weldrod, by which the arc is conducted to fuse the metal of the tubular section in the region of the meeting edges.

The tubular sections 10 thus produced are machined at their ends as at 11, so as to contribute to the formation of a suitable deep welding groove in which a fusible weldrod may enter and reach the bottom thereof, when the sections are assembled end to end, and in which welding metal flowing from the weldrod will be deposited in successive layers until the groove is filled. The welding groove may be variously formed, but as illustrated in Fig. 2, the edges at the meeting ends of the sections 10 are beveled from the outside so as to form at the inside diameter a circular projection or inner rim 12.

Bubble towers are required to be provided with inside supports or shelves upon which may rest the drip pans and gas bells used in refining crude oils. Heretofore, it has been the usual practice to support the shelves upon brackets attached to the inside of the bubble tower, or by welding the shelves directly to the inside walls of the tower, this arrangement necessitating great care in positioning the shelves.

My invention contemplates the arrangement of the supporting shelves in exact position at the time the bubble tower is constructed and incorporating the said shelves as integral parts of the construction of the tower. To achieve this properly, I form ring plates 13 from heavy metal plates and machine the latter at their outside diameter so as to form upper and lower shoulders 14 and 15 and an intermediate projecting circumferential rib or tongue 16. These ring plates should be machined so that their diameter between the opposite margins where the shoulders are formed will be exactly that of the inside diameter of the tubular sections 10, as shown in Fig. 2. The circular projections or rims 12 formed at the ends of adjoining sections 10 are designed to rest against the shoulders 14 and 15 of the ring plate, and upon the tongue or rib 16 which extends for a short distance between the circular projections or inner rims 12, spacing the ends of the said tubular sections 10.

When assembled as above described and as illustrated in Fig. 2, an exterior circumferential groove is formed at the meeting line of the parts, and this is utilized for welding the assembled parts into an integral structure, an electric arc being employed for this purpose. I prefer to employ a specially prepared weldrod, the arc passing therefrom fusing the parts adjacent the groove. The molten metal flowing from the weldrod will unite with the fused surfaces of the contiguous parts and the welding will be continued until the groove is filled and the symmetry of the exterior of the bubble tower is restored or made uniform. As a matter of economy in the use of weldrods, I may place additional welding material in the form of rods, strips or slugs in the welding groove, such additional welding material being fused by the electric arc and incorporated in the welded joint as a part thereof, as indicated at 17 in Fig. 1.

After two sections have been welded, a third section with another ring plate 13 is welded thereto as before described, and this process will be followed until the main tube of a bubble tower of the required length has been built up. In the manufacturing process, the ring plates 13 forming the shelves, are caused automatically to occupy the exact positions desired in the length of the bubble tower, and the former manual work in accurately positioning the shelves is eliminated. My improved method of construction is such that the required angularity of the transversely disposed shelves with respect to the axis of the bubble tower and their longitudinal position is assured by the simple procedure followed in assembling the parts.

Heads or ends 18 and 19 are then welded to the tubular structure to complete the bubble tower, welding grooves to permit joining of the heads or ends to the main tubular body being provided by machining as before. But it will be within my invention to form the heads as one with the end sections of the tubular structure by lengthening the same, instead of providing for their separate attachment in the manner illustrated.

Having thus described my invention, what I claim and desire to secure by Letters Patent of the United States, is:

1. In a bubble tower, a plurality of tubular sections arranged end to end and transversely arranged interior shelves in the line of the meeting ends of the tubular sections, and welded at such meeting lines into an integral structure.

2. A bubble tower of integral structure comprising a plurality of tubular sections arranged end to end and welded in their meeting lines into a tubular body, in combination with transversely arranged shelves disposed interiorly of the body and welded thereto exteriorly of the body on circumferential lines of the latter, and heads welded to the ends of the tubular body to complete the structure.

3. A bubble tower of integral construction comprising a succession of tubular sections arranged end to end to produce a tubular structure of the desired length, in combination with transversely arranged shelves positioned interiorly of the tubular structure and between the meeting ends of the tubular sections and welded thereto exteriorly of the sections on circumferential lines, and heads welded to the ends of the tubular structure.

4. A bubble tower of integral construction comprising a succession of tubular sections arranged end to end to produce a tubular structure of the desired length, in combination with transversely arranged shelves positioned interiorly of the tubular structure and between the meeting ends of the tubular sections to space the latter apart and welded thereto in such spaces on circumferential lines, and heads welded to the ends of the tubular structure.

5. In a bubble tower, a plurality of tubular sections assembled end to end, shelves each formed with a peripheral rib or tongue positioned between the ends of adjacent tubular sections to separate the latter, the parts being arc welded in their meeting lines to constitute an integral tubular structure with interior shelves.

6. In a bubble tower, a plurality of tubular sections assembled end to end, and shelves as ring plates each formed with a circumferential rib or tongue upon its periphery and positioned one such shelf with its rib or tongue between the ends of the adjacent sections to separate the latter and form a welding groove, the parts being welded in their meeting lines to produce a tubular body of the desired length, and heads welded to the tubular structure to complete the same.

In testimony whereof, I have signed my name at Milwaukee, this 7th day of August, 1925.

R. STRESAU.